Nov. 4, 1952    R. R. PERKINS    2,616,654
COFFEE MAKER
Filed March 13, 1950
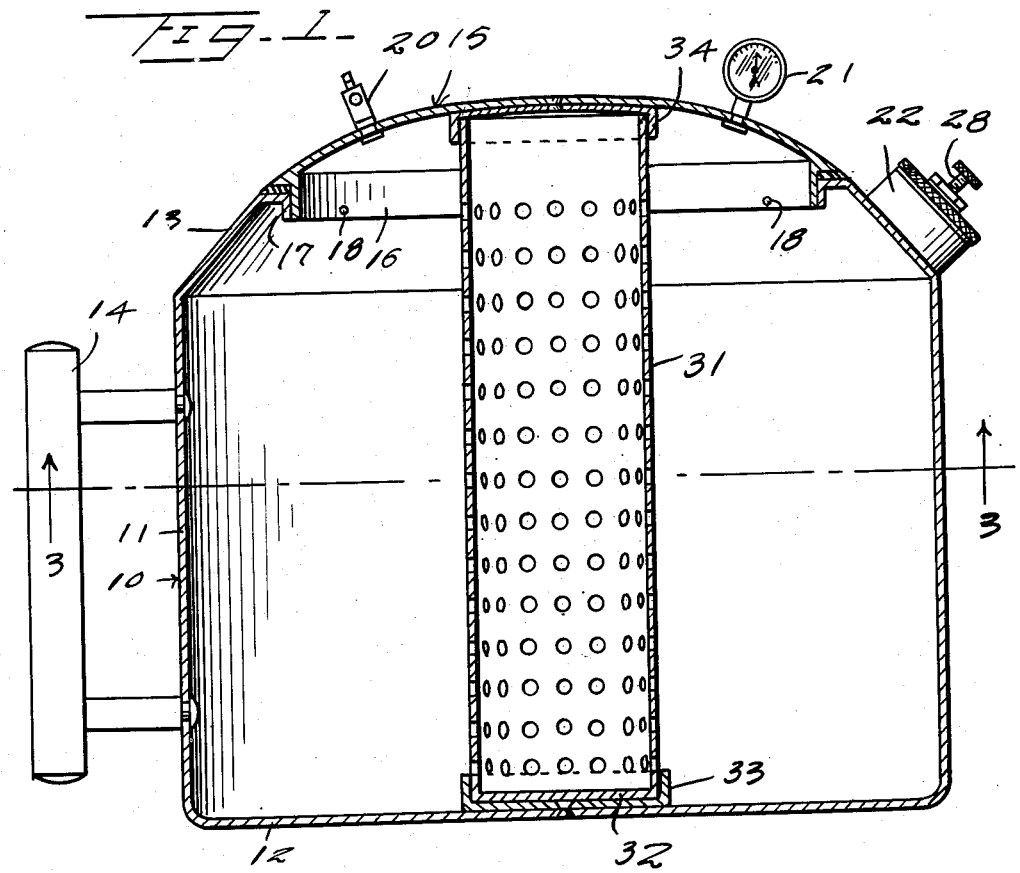
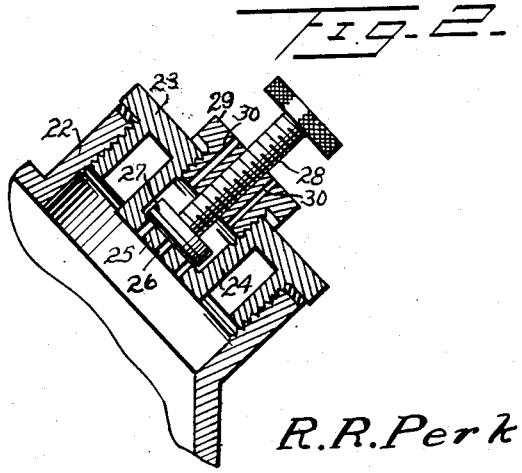
INVENTOR
R. R. Perkins
BY
Kimmel & Crowell
ATTORNEYS Patented Nov. 4, 1952

2,616,654

UNITED STATES PATENT OFFICE 2,616,654

COFFEE MAKER

Ronald R. Perkins, Dallas, Tex.

Application March 13, 1950, Serial No. 149,279

1 Claim. (Cl. 251—43)

This invention relates to a coffee maker.

An object of this invention is to provide a coffee maker of the pressurized type wherein the coffee is made under pressure.

Another object of this invention is to provide in a pressurized coffee maker an improved receptacle for the grounds.

A further object of this invention is to provide a receptacle having a spout with a pressure release valve carried by the spout so that pressure can be gradually released.

With the above and other objects in view, my invention consists in the arrangement, combination and details of construction disclosed in the drawings and specification, and then more particularly pointed out in the appended claim.

In the drawings:

Figure 1 is a vertical sectional view taken along the center line of one form of the device embodying this invention.

Figure 2 is a fragmentary sectional view taken through the delivery spout, showing the pressure relief valve.

Referring to the drawings, the numeral 10 designates generally a receptacle which is formed with a cylindrical side wall 11, a bottom wall 12, and a tapered frustro-conical upper portion 13. A handle 14 is secured to and extends from the side wall 11 of the housing 10. A dome shaped cover 15 is removably mounted on the upper end of the receptacle 10 and includes a depending annular flange 16 which engages within an inwardly offset annular flange 17 carried by the upper portion 13 of the receptacle 10. The flange 16 has secured thereto a plurality of circumferentially spaced apart locking pins 18 which are engageable in suitable bayonet slots formed in the flange 17.

A spring pressed safety valve 20 of conventional construction is secured to the closure 15, and a pressure indicator 21 is also secured to the closure 15. The frustro-conical portion 13 has extending angularly and upwardly therefrom a cylindrical spout 22 formed with interior threads within which a cap 23 is threadably mounted. The cap 23 includes a cylindrical member 24 and an inner wall 25 formed with pressure release openings 26. A pressure release valve 27 is carried by a stem 28 which is threaded through a gland 29, and the gland 29 is formed with openings 30. The outer side of the wall 25 forms a valve seat for the valve member 27 when this latter member is threaded inwardly to a closed position.

A perforated cylindrical coffee ground holder 31 formed with a bottom wall 32 is disposed centrally within the housing 10 and is seated at its lower end in a cup-shaped member 33 which is fixed to the bottom wall 12. An inverted cup-shaped member 34 is fixed to the inner side of the cover 15 and engages over the upper open end of the holder 31. The two cup-shaped members 33 and 34 provide a means for holding the holder 31 centrally of the housing or receptacle 10.

In the use and operation of this device the coffee grounds are placed in the holder 31, and the cover 15 is then tightly secured to the upper end of the receptacle 10. Valve member 27 at this time will be moved inwardly to a position closing the ports or openings 26.

The water in the receptacle 10 is heated for a predetermined period of time, thereby producing a predetermined pressure in the receptacle, and if the pressure should become excessive the pressure is partially reduced by the safety valve 20. After the coffee has been produced the pressure in the receptacle 10 may be relieved by moving release valve member 27 outwardly so that the pressure may exhaust through ports 26 and 30. When the pressure has been exhausted in receptacle 10 the cap 23 may be removed and the liquid poured through the spout 22.

What is claimed is:

A valve assembly for use with a pressurized coffee maker including a receptacle having an internally threaded spout and a cap therefor, said cap comprising a plate, an outer externally threaded flange engageable in said spout and an inner internally threaded flange dependingly surrounding a central aperture in said plate, an inner wall having openings therethrough at the base of said inner flange; an externally threaded gland engageable with the threads of said inner flange, said gland having a central internally threaded bore therein and off-center vent parts, a valve guide threaded into said bore, and a valve of less diameter than the inner flange on said valve guide for opening and closing said openings in said inner wall.

RONALD R. PERKINS.

REFERENCES CITED

The following references are of record in the file of this patent:

UNITED STATES PATENTS

| Number | Name | Date |
|---|---|---|
| 173,713 | Brewster | Feb. 22, 1876 |
| 1,070,453 | Griffin | Aug. 19, 1913 |
| 1,596,415 | Enright | Aug. 17, 1926 |

FOREIGN PATENTS

| Number | Country | Date |
|---|---|---|
| 65,998 | Sweden | of 1927 |
| 214,052 | Great Britain | of 1924 |
| 237,151 | Great Britain | of 1925 |
| 610,938 | Great Britain | of 1948 |
| 653,219 | France | of 1929 |